July 25, 1933. S. P. ENRIGHT 1,919,779
TOILET FLUSHING APPARATUS
Filed April 18, 1930 4 Sheets-Sheet 3
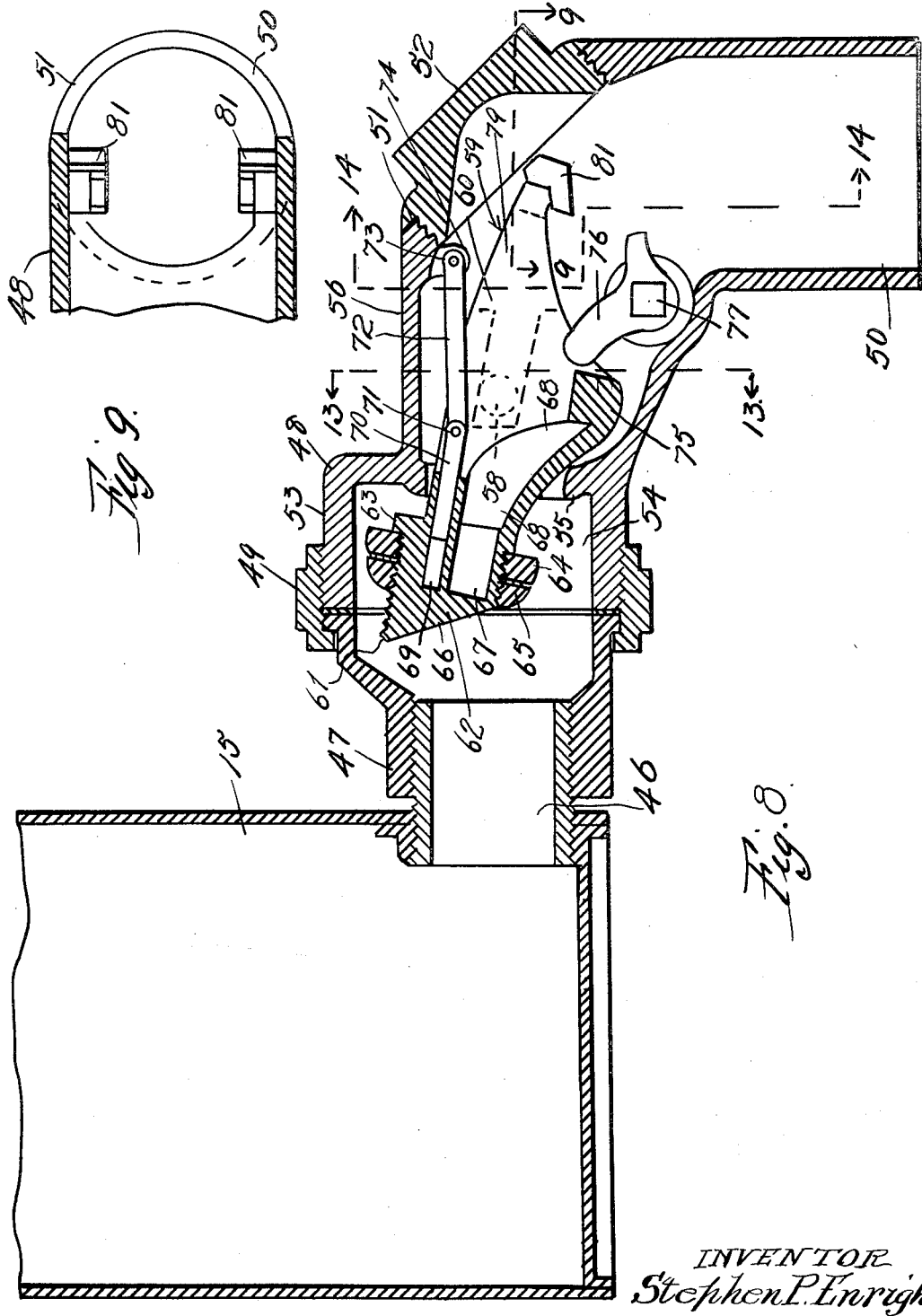

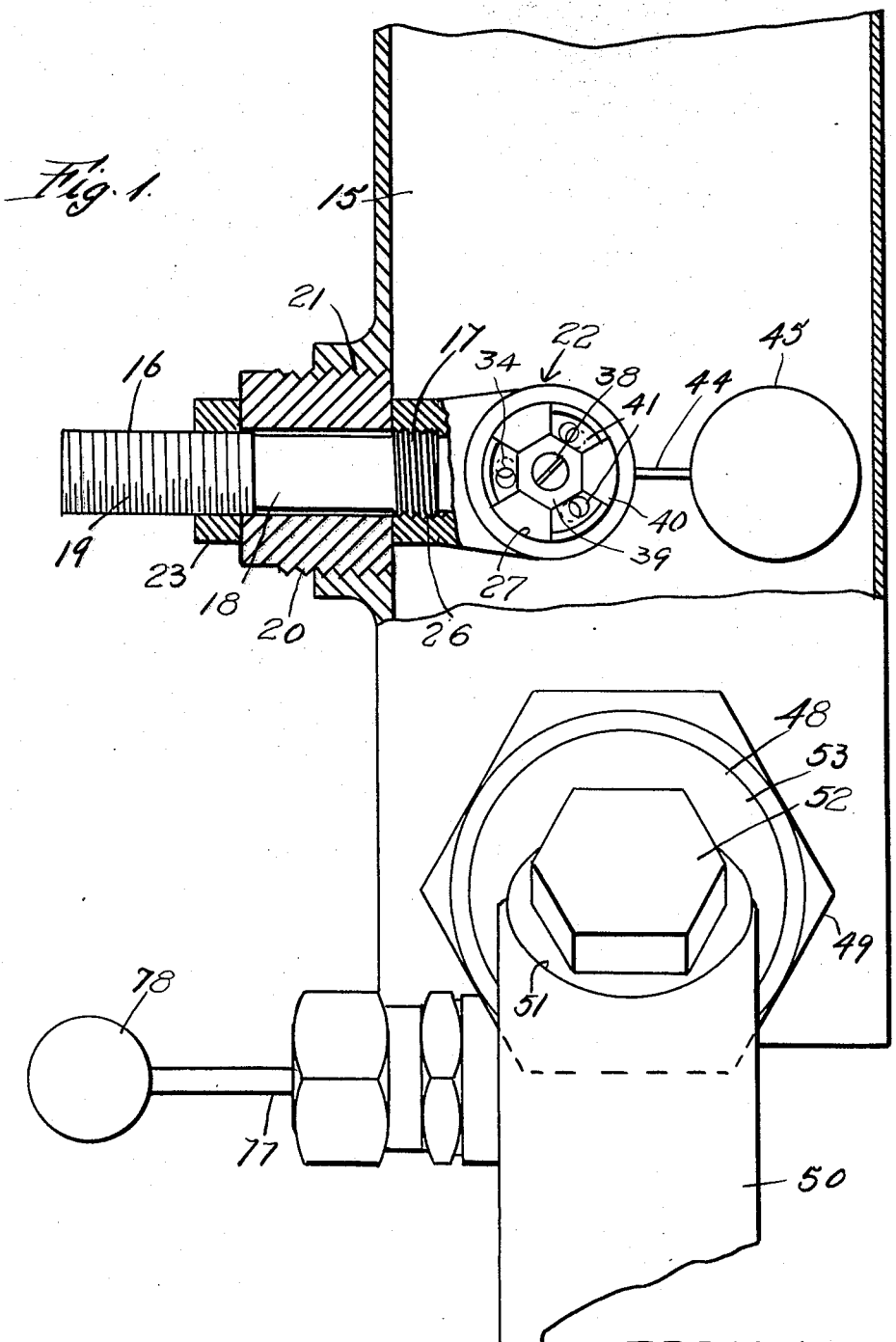

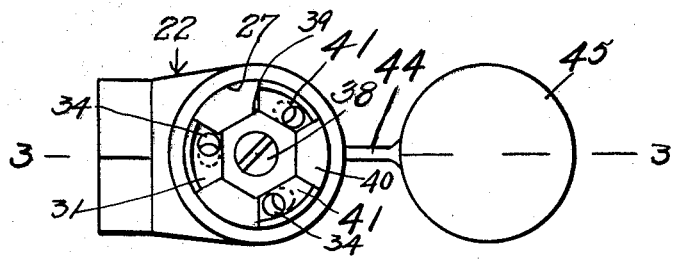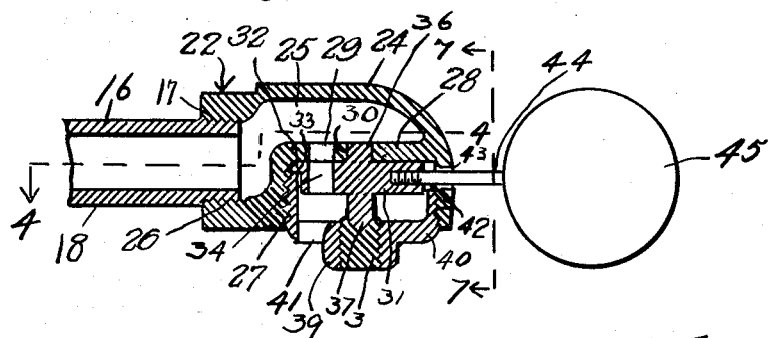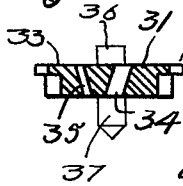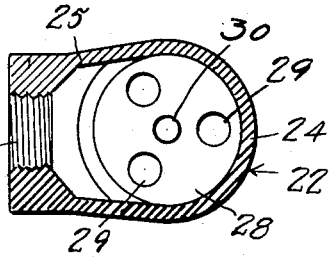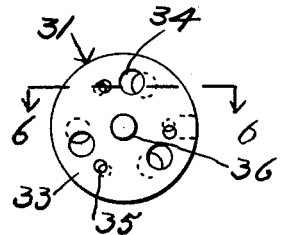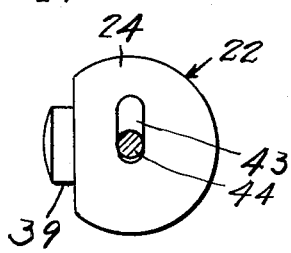

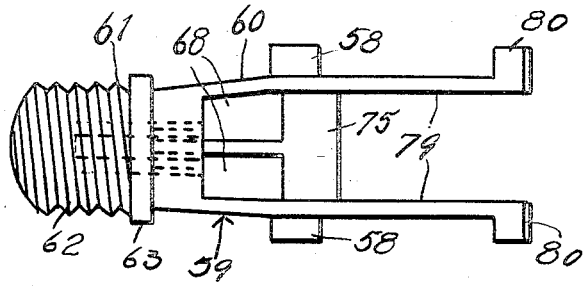
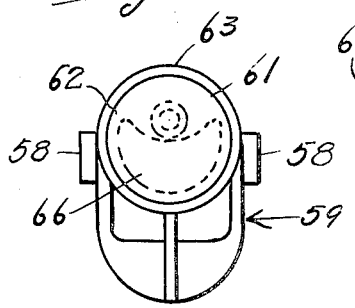
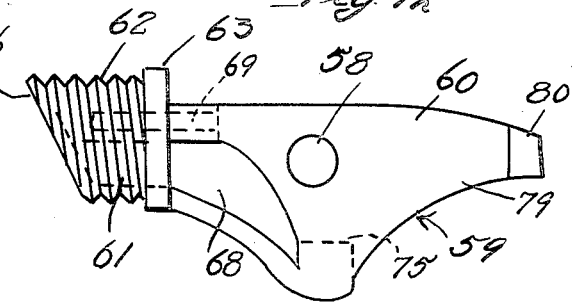
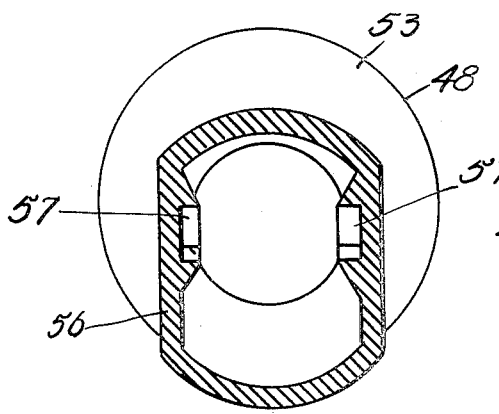
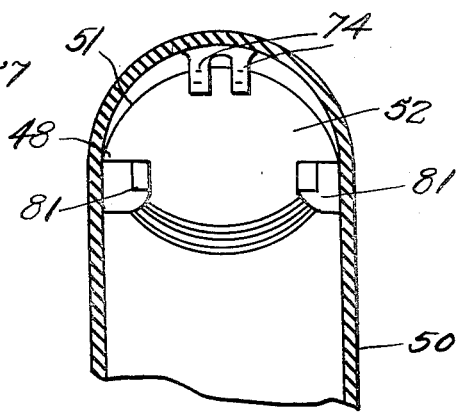

Patented July 25, 1933

1,919,779

UNITED STATES PATENT OFFICE

STEPHEN P. ENRIGHT, OF PHILADELPHIA, PENNSYLVANIA

TOILET FLUSHING APPARATUS

Application filed April 18, 1930. Serial No. 445,293.

My invention relates to new and useful improvements in toilet flushing apparatus consisting essentially of a flush valve and a regulator and has for one of its objects to provide an apparatus combining a flush valve and regulator particularly adapted for operation in connection with water under variable pressure.

Another object of the invention is to provide a toilet flushing apparatus which is relatively simple in construction for use in connection with an air-trapped tank which may be placed within the walls of the ordinary building or behind a panel provided especially for this purpose so that the whole structure is compact with the majority of the parts invisible.

A further object of the invention is to provide a regulator of unique construction with the ports arranged to assist the operation thereof in moving from one position to another, such as from the closed position to the open position.

A still further object of the invention is to provide a new and improved flush valve as one of the elements of the toilet flushing apparatus.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a fragmentary side elevation of a toilet flushing apparatus constructed in accordance with my invention and illustrating the position of the flush valve and regulator relative to the tank, a portion of the latter being broken away and shown in section to illustrate the operation of the regulator.

Fig. 2 is a front elevation of the regulator per se.

Fig. 3 is a section on the line 3—3 of Fig. 2 with the float shown in elevation.

Fig. 4 is a section on the line 4—4 of Fig. 3.

Fig. 5 is an inner or working face view of the regulator disc.

Fig. 6 is a section on the line 6—6 of Fig. 5.

Fig. 7 is a section on the line 7—7 of Fig. 3.

Fig. 8 is a vertical sectional view through the tank broken away and the flush valve shown in an open position.

Fig. 9 is a section of the flush valve casing only on the line 9—9 of Fig. 8.

Fig. 10 is a top plan view of the valve member per se.

Fig. 11 is a front end elevation thereof.

Fig. 12 is a side elevation of the same.

Fig. 13 is a section of the flush valve casing only on the line 13—13 of Fig. 8.

Fig. 14 is also a section of the flush valve casing only on the line 14—14 of Fig. 8.

In carrying out my invention as herein embodied, 15 represents a relatively small air-trapped tank which is preferably located within the wall of a building or within a panel box and is supplied with water preferably adjacent its lower end through a service or inlet pipe 16, the latter having an exteriorly threaded inner end 17, and intermediate plain portion 18 and an exteriorly threaded outer end 19.

The pipe 16 passes through a reducing ring 20 which is exteriorly threaded for mounting in the threaded opening 21 in the water tank 15. The opening 21 is of sufficient size for the passage of the regulator 22 which has its inlet end screwed on to the threaded inner end of the pipe 16 and said regulator is drawn against the reducing ring by means of a nut 23 screwed on to the threaded outer end of the pipe 16 and bearing against the reducing ring 20.

The regulator 22 includes a casing 24 provided with an inlet chamber 25 to which the inlet opening 26 leads and also provided with a recess 27 separated from the inlet chamber 25 by a wall 28 having a plurality of arcuately spaced apertures 29 and a bearing hole 30 centrally located relative to all of said holes.

Within the recess 27 is mounted the regulator disc 31 provided with a peripheral flange 32 around one or the working face 33 of the regulator disc and said working face 33 is seated against the outer face of the wall 28 or that face of the wall which forms a part of the recess 27. The disc is provided with a plurality of apertures 34 running from one face of the disc to the other obliquely to the axial center of the disc and said apertures 34 are spaced the same as the apertures 29 with which they register under certain conditions as will be later explained. The disc also has a plurality of small holes 35 passing therethrough from one face to the other and these are also arranged obliquely to the axial center of the disc but run in a direction opposite to the apertures 34 adjacent thereto. Projecting from the working face of the disc is a trunnion 36 for registration with the hole 30 in the wall 28 and projecting from the opposite face thereof is a tapered bearing pin 37, the end of which is socketed in a recessed screw 38 threaded into the boss 39 of the cap 40 which in turn is threaded into the recess 27 of the regulator casing and said cap 40 has a number of outlet openings 41. The inner edge of the cap 40 engages the flange 32 of the regulator disc and in connection with the wall 28 forms a guide groove in which the flange of the disc rotates and in the side wall of the cap is formed a notch 42 and which coincides with the elongated hole 43 in the regulator casing when said cap is in place and provides operating space for the stem 44 of the float 45 which stem is screwed into the circumference of the disc.

Assuming that the regulator is in what I term the closed position as in Figs. 2 and 3, then the apertures 34 are out of alignment with the apertures 29 but the small holes 35 are in registration with the apertures 29 and looking into the front face of the regulator as in Fig. 2, the apertures 34 run inward obliquely what might be termed counter clockwise while the holes 35 under the same conditions run obliquely clockwise and it has been found that because of this formation as soon as the water line in the tank approaches the position to cause the disc to begin closing the apertures 29, the flow of water through the regulator will have a propeller action upon the disc due to the arrangement of the apertures 34 so as to quickly move the disc toward its closed or partially closed position while the opposite action takes place as the small holes 35 move away from the apertures 34 during the opening movement of the disc.

As soon as the apertures 34 are in full registration with the apertures 29, the supply water quickly runs into the tank finally submerging the float 45 and will continue to run into the tank until the air in such tank has been compressed to a point equal to the pressure of the water supply when, of course, no more water can flow into the tank although the inlet to said tank is constantly open due to the registration of the apertures 34 with the apertures 29.

From the bottom of the tank leads an outlet pipe 46 which is connected in any suitable manner with the union nipple 47, the latter being detachably fastened to the inlet end of the flush valve casing 48 by means of the union nut 49 while the outlet end 50 of the flush valve casing is adapted to be connected in any suitable manner with a toilet bowl or hopper and said outlet end may project at right angles to the inlet end as shown in Fig. 8, although this particular arrangement is not absolutely essential or necessary. Where the inlet and outlet ends of the casing are at right angles to each other, an access opening 51 is preferably provided at the elbow, said opening being normally closed by a plug 52.

The valve casing has a mouth 53 at the inlet end providing a chamber 54 within which is located the valve seat 55 and said mouth is eccentric to the main body 56 of the flush valve casing so that the axial center of the latter is below the axial center of the mouth and intermediate the ends, said body is slightly contracted from the sides as shown in Fig. 13 and in the flattened or contracted portions are formed the inclined guideways 57, the said guideways being inclined upwardly and forwardly as best seen in Fig. 8.

In the guideways are slidably mounted the trunnions 58 of the valve member 59 so that under certain conditions, said valve member may readily slide upwardly and downwardly for a purpose to be presently described. The valve member 59 includes a frame 60 having a head 61 and having a reduced exteriorly threaded portion 62 and a flange 63. On the reduced threaded portion is mounted the valve plug or washer 64 with one face in engagement with the flange 63 and being held in place by a nut 65 screwed on to the threaded reduced portion of the head. The head has a downwardly beveled end wall or face 66 as well as a chamber 67 open only at the back of the head or opposite to the face 66 and this chamber is in communication with the exterior of the valve member through the openings 68 in the frame whereby under some conditions, water passing through the valve casing will switch about and enter the chamber 67 through the openings 68 so that the back lash of said water will tend to lift the head of the valve member and move it away from the valve seat.

In the head is also formed a bore 69 in which is slidably mounted the plunger 70 so as to act as a dash pot or buffer and the outer end of said plunger 70 is pivoted at 71 to one end of a rod 72 while the other end of said rod 72 is pivoted at 73 to some suitable part of the flush valve casing as between the ears 74, Fig. 14. The fit of the plunger 70 in the bore 69 is such that either air or water may slowly enter the bore as the head of the valve member is moved outward or away from its valve seat and therefore will prevent the valve member from moving toward its valve seat at a very great speed.

Across the lower portion of the frame is a bridge 75, the rear edge of which is engaged by a lug 76 mounted on the operating spindle 77 suitably journalled in the valve casing and carrying an operating handle 78 so that when the latter is actuated in the proper direction, the lug 76 will press upon the bridge 75 to give the valve member either an initial or complete movement to lift the valve plug 64 away from the seat 55.

The frame of the valve member also includes rearwardly projecting legs 79 which, if found desirable, may have out-turned toes 80 in order to increase the bearing surface of the legs on the rests 81 projecting from opposite sides of the valve casing and so positioned that the legs, or more particularly the toes 80 engage said rests when the valve member is in an open or raised position as shown in Fig. 8 and said valve member can be maintained in this position so long as a sufficient volume of water is flowing through the flush valve to hold the legs in engagement with the rests under sufficient pressure to counteract the weight of the head of the valve member, but when the volume of water is decreased so that the weight of the head of the valve member can tilt said valve member then the legs 79 will be disengaged from the rests and the valve member will move rearwardly and downwardly in the guideways 57 until said valve member is seated.

The operation of the device is as follows:—

Assuming that the air-trapped tank 15 contains water, as soon as the handle 78 is operated in the proper direction to oscillate the spintle 77, the lug 76 will engage the bridge 75 and give an initial forward upward movement to the valve member 59. This action will unseat the valve member and water will immediately begin to flow through the valve casing from the tank. The action of the water in trying to force its way through the small passageway first caused by the unseating of the valve member will lift the head end of said valve member and move it outward due to the swirling or back lash of the water as it passes through the openings 68 and enters the chamber 67. As soon as the valve member is fully open, the legs 79, and more particularly the toes 80 thereof will engage the rests 81 and the pressure of water against the beveled face 66 of the head of the valve member will assist in retaining said valve member in the position shown in Fig. 8, which is the open position and the pressure of water against the head of said valve will also force the legs 79 firmly against the rests 81 also assists in holding the valve member in the open position.

As soon as the flush valve is actuated, the handle can be released and therefore the lug 76 will move away from the bridge 75 of the valve member. As the level of the water in the tank 15 lowers, the float 45 will gradually descend rotating the disc 31 until the apertures 34 pass beyond the apertures 29 and finally the small holes 35 will begin to register with said apertures 29. This will materially cut down the flow of water from the suppy pipe into the tank but the action of the water passing through the small holes will quickly rotate the disc 31 through the final stage of its rotation for closing the regulator. Thereafter, only a small amount of water can pass into the tank because of the small capacity of the holes 35.

This closing down of the water supply to the tank will materially cut the flow through the flush valve so that the weight of the head of the valve member will overcome the force of the water and therefore said valve member will be tilted to disengage the legs thereof from the rests 81. Thereafter, the head of the valve member will be directly in the steam of water passing through the flush valve casing and so said valve member will be seated to shut off the flow to the bowl or hopper.

As soon as the flush valve is closed, water will begin to rise in the tank 15 and gradually elevate the float 45 so as to rotate the disc 31 counter-clockwise and just as the small holes 35 leave the apertures 29, and because of the oblique arrangement of said holes 35, the action of the water will quickly rotate the disc during its final opening stage so that the water can flow quickly into the tank until such time as the air compressed above the water has a pressure equal to the water supply and thereafter no more water will flow into the tank.

During the closing of the valve member, the dash pot mechanism which includes the plunger 70 will function to ease off the closing movement and eliminate objectionable noises which might otherwise occur.

Of course I do not wish to be limited to the exact details of construction as herein shown, as these may be varied within the limits of the appended claims without departing from the spirit of my invention.

Having thus fully described my invention, what I claim as new and useful is:—

1. In a toilet flushing apparatus, a regulator consisting of a housing, one wall of which is provided with a plurality of outlet apertures, a disc co-operating with the apertured wall and adapted to rotate, means mounted in the front face of said housing to hold the disc in place, said disc having apertures running obliquely through the same from face to face in a counter-clockwise direction when considered as looking directly into the front face of the regulator, and said disc further having holes running obliquely completely through the disc from face to face clockwise when considered as looking into the front face of the regulator, and a float connected with said disc.

2. In a device of the character described, a casing having a water inlet, one of the walls of said casing having apertures therethrough to form outlets and a disc rotatably mounted against the apertured wall for controlling the outlet apertures, said disc having alternate large apertures and small holes therethrough equal in number to the apertures in the casing and for alternate registration with the apertures in the casing wall, the apertures and holes in the disc extending obliquely to the axis of the disc and each adjacent aperture and hole through the disc diverging toward the inner face of said disc.

3. In a toilet flushing apparatus, a regulator consisting of a housing having an apertured wall between an inlet chamber and a recess, a disc rotatably mounted in the recess and having a set of large apertures arranged obliquely to the axial center of said disc and a set of holes also arranged obliquely to the axial center of said disc, each in a direction opposite to the adjacent oblique aperture, the set of apertures and the set of holes adapted to register with the apertures in the wall of the housing at different times, a float connected with the disc to be operated by the rise and fall of a water line for rotating the disc, a cap threaded into the recess of the housing and engaging a peripheral flange on said disc, a trunnion projecting from one face of the disc for registration with a hole in the apertured wall of the housing, a tapered bearing pin, and a screw threaded in the cap and having a socket for registration with said tapered bearing pin.

STEPHEN P. ENRIGHT.